United States Patent [19]
Schaevitz

[11] 3,739,828
[45] June 19, 1973

[54] TIRE UNDERTREAD PROBE

[75] Inventor: Abraham R. Schaevitz, Collingswood, N.J.

[73] Assignee: Super Tire Engineering Company, Camden, N.J.

[22] Filed: June 18, 1971

[21] Appl. No.: 154,527

[52] U.S. Cl............................................. 152/209 R
[51] Int. Cl............................................. B60c 11/00
[58] Field of Search....................................... 152/209

[56] References Cited
UNITED STATES PATENTS
1,876,016  9/1932  Pederson ........................... 152/209
2,960,138  11/1960  Chiodo ............................. 152/209

FOREIGN PATENTS OR APPLICATIONS
411,727  6/1934  Great Britain...................... 152/209

Primary Examiner—James B. Marbert
Attorney—Henry N. Paul, Jr., Wallace D. Newcomb, Austin R. Miller et al.

[57] ABSTRACT

A heavy-duty truck or bus tire has main tread grooves and sub-grooves therein. The sub-grooves extend downwardly from the floor of the main grooves into what would otherwise be the undertread. The sub-grooves are referred to as undertread probes. The remainder of the undertread below the sub-grooves or undertread probes is sufficiently thick to comply with design technology. The undertread probes are in the floor of the main grooves and are located at spaced intervals. The undertread probes are narrower in width than the main grooves. The undertread probes are provided with ties.

6 Claims, 8 Drawing Figures

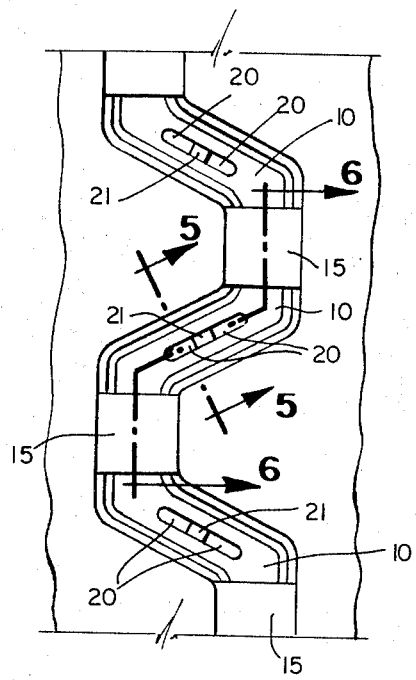
Fig. 2
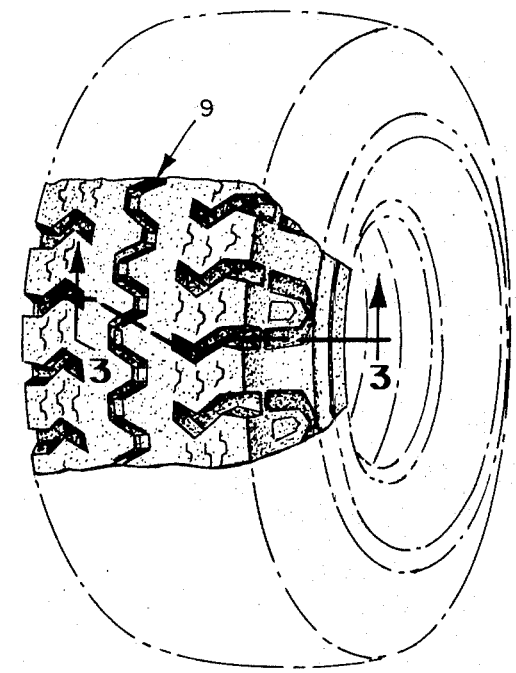
Fig. 1
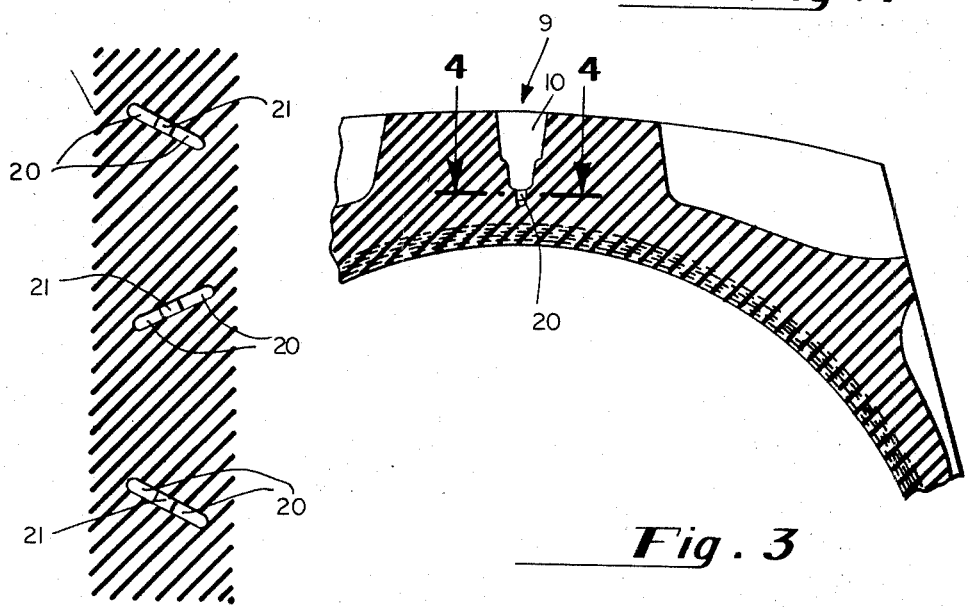
Fig. 4
Fig. 3
INVENTOR.
Abraham R. Schaevitz
BY
Paul & Paul
ATTORNEYS.

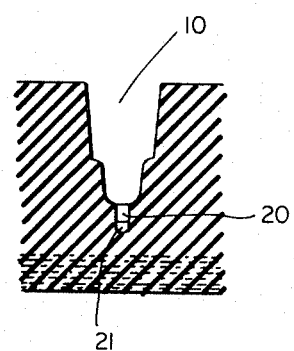
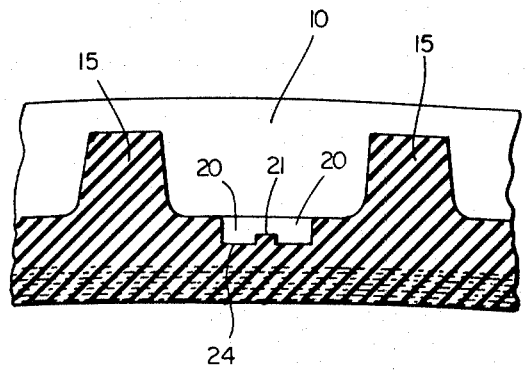
Fig. 5    Fig. 6
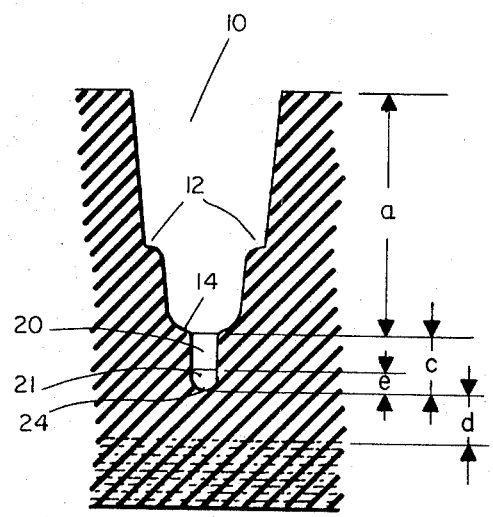
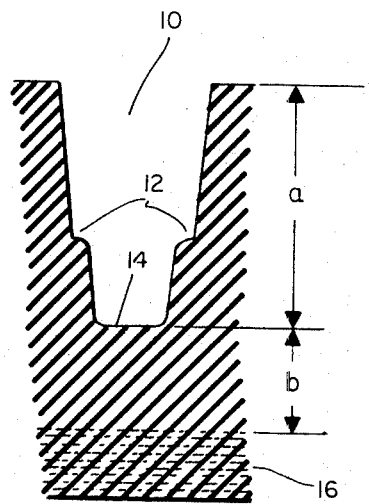
PRIOR ART
Fig. 7    Fig. 8
INVENTOR.
Abraham R. Schaevitz
BY
Paul + Paul
ATTORNEYS.

TIRE UNDERTREAD PROBE

BACKGROUND OF THE INVENTION

As is well known, pneumatic tires for motor vehicles are constructed with a cord or wire foundation and a heavy rubber covering. The rubber covering is molded with treat grooves arranged in a pattern or design forming a tread portion above an undertread portion which is not grooved. Governmental regulations (federal and/or state) set forth requirements as to the extent to which tires may be used in worn condition as measured by minimum depth of tread. The requirements may vary according to usage. For example, bus tires may have more restrictive requirements than do truck tires. And front wheel tires may have more severe restrictions than the tires of rear or non-steerable wheels.

The present invention relates particularly to heavy-duty truck and bus tires. Tires represent a heavy and significant expense to operators of heavy-duty trucks and buses, and, accordingly, such operators have long been interested in extending the life of their heavy-duty tires while at the same time maintaining adequate safety.

In an effort to meet the demand of the heavy-duty truck and bus operators, tire manufactures have designed new truck tires with deeper tread designs in a variety of configurations to give the desired traction and mileage demanded by the truck and bus owners. In designing a tread pattern to increase tire life, while at the same time maintaining adequate safety, it is always necessary to provide sufficient undertread to give proper support to the grooves of the original tread imprint on the tread surface. The support of the tread grooves is important and vital. Sufficient strength and support to the tread grooves must be given to prevent cracking in the base of the groove that may otherwise be caused by the expansion of the groove resulting from the internal air pressure within the casing.

In use, as the tread design in the original tread surface wears down, the area of tread known as the undertread is reached. This appears as a solid surface unbroken by any tread pattern. This undertread is a usable rubber surface and can be a long-wearing addition to the ultimate tire life, provided it can be safely utilized.

A past practice in the industry has been to utilize material remaining in the undertread, after the original tread has been worn down to an allowable point, by causing a new tread pattern to be introduced into the undertread. This has been done by manually grooving the undertread with a hot cutting tool or blade so as to remove small portions of the undertread, thereby providing a new broken surface giving a tread to allow further use of the tire. Since such regrooving is normally done with hand-tools, the grooves or cuts created are not uniform in depth or design. Moreover, the work represents a costly hand operation. It also results in the loss of vehicle use time in that the tire is normally removed from the vehicle in order to effect the regrooving.

SUMMARY OF THE INVENTION

A purpose of the present invention is to provide a way of extending safely the life of a tire by taking advantage of all usable material of the tire, without requiring any additional labor, effort, or expense on the part of the tire user.

A more specific object is to provide an original tire which, without subsequent regrooving of the undertread, has the mileage life of a tire which when worn is regrooved for extended use.

Another object is to provide a new tire tread design characterized by tread grooves which extend down toward the cord or wire body of the tire into the undertread to a depth which will allow maximum utilization of the tire life while being in compliance with governmental requirements, and nevertheless maintaining the necessary strength and support to the tread grooves to prevent cracking in the base of the groove and to prevent tread instability.

These and other objects are accomplished by providing a tire having main tread grooves, and providing sub-grooves or undertread probes in the floor of the main grooves. The sub-grooves or undertread probes are located at spaced intervals and have a width less than that at the floor of the main grooves. The probes have a depth which extends into the undertread toward the cord or wire body to an extent that will achieve a maximum tread depth that will continue to comply with minimum tread-depth requirements. The undertread probes are provided with tie bars.

BRIEF DESCRIPTION OF THE DRAWINGS

FIG. 1 is a perspective illustration of a tire tread which incorporates a presently preferred form of the invention;

FIG. 2 is a fragmentary plan view of the main circumferential tread groove of the tire of FIG. 1, showing the undertread probes therein;

FIG. 3 is an elevational view, in section, of a portion of the tire tread looking along the line 3—3 of FIG. 1;

FIG. 4 is a view looking along the line 4—4 of FIG. 3;

FIG. 5 is an enlarged fragmentary view of the main tread groove and undertread probe, looking along the line 5—5 of FIG. 2;

FIG. 6 is an enlarged fragmentary view of the main tread groove and the undertread probe, looking along the line 6—6 of FIG. 2;

FIG. 7 is a view similar to FIG. 5 but enlarged;

FIG. 8 is a view of a prior-art tread groove for comparison with the new tread and undertread probe illustrated in FIG. 7.

DESCRIPTION OF THE PREFERRED EMBODIMENTS

FIG. 1 shows in solid line a portion of a tire tread embodying a presently preferred form of the present invention, the remainder of the tire being shown in phantom. The point of novelty of the illustrated invention is related to the centrally located circumferential tread groove 9, which is seen to follow a sinuous path. A plan view of a segment of this central tread groove 9 is shown in FIG. 2. Elevation views in section are given in FIGS. 3, 5, 6 and 7.

The central tread groove 9 comprises, in accordance with the present invention, a main groove 10 and an undertread probe 20. The main groove 10 corresponds to the tread groove of the prior art, as illustrated in FIG. 8. It will be seen that the walls of the main tread groove 10 are slightly inclined inwardly, and that at about two-thirds of the way down the width of the main tread groove 10 abruptly narrows, forming the shoulders 12. The floor of the main groove is designated 14. As seen in FIGS. 2 and 6, the walls of the main groove 10 are tied together at regular intervals by tie bars 15. These tie bars 15 assist in providing the necessary strength and stability to the main tread.

In FIGS. 7 and 8, the depth of the main tread groove 10 is designated "a." Below the floor 14 of the prior art tire shown in FIG. 8, and extending downwardly to the cord 16, is a solid undertread. The thickness of the undertread is designated "b."

In prior art practice, when the tire tread wears down to a point within a specified small distance of the floor 14 of the tread groove, the tire no longer has sufficient depth of tread to comply with safety regulations. When so worn, heavy-duty truck or bus tires are sometimes regrooved by gouging out portions of the undertread along floor 14 of the groove to give the tire additional tread depth to meet the requirements of governmental regulations.

In accordance with the teaching of the present invention, regrooving of the worn tire is avoided by molding the tire tread initially with sub-grooves or undertread probes 20 in the floor 14 of the main tread groove 10. The undertread probes 20 have a width less than the width of the main groove 10 at the level of floor 14. The undertread probes 20 have a length which is shorter than the length of the pockets of the main groove 10 between the tie bars 15. The undertread probes 20 have a depth such that the thickness of the rubber remaining between the floor 24 of the undertread probe 20 and the upper limit of cord or wire body 16 is sufficient to satisfy structural requirements.

The undertread probes 20 are provided with a tie bar 21 having a height above the floor 24 of the undertread probes 20 equal to the minimum depth of tread required by governmental regulations. The tie bars 21, which are preferably located at the center of the undertread probes, strengthen and stabilize the walls of the undertread probes. The tie bars 21 also perform a second function. They provide a signal that the tire tread has been worn down to a point where the maximum utility of the tire has been achieved and the tire must now be removed as no longer complying with safety regulations. This signal is given when the tread is worn down to the top of the tie bars 21.

Referring now to FIGS. 7 and 8, the depth "a" of the main groove, in the prior art tire of FIG. 8 and also in the new tire of FIG. 7, may, in a typical case, by 26/32 inch. The thickness "b" of the undertread in the prior art tire (FIG. 8) may be 10/32 inch. In the new tire (FIG. 7) the depth "6/32 of the undertread probe may be 6/32 inch, and the thickness "d" of the solid undertread may be 4/32 inch. The height "e" of the tie bars 21 may be 2/32 inch above the floor 24 of undertread probe 20. In other words, the present invention proposes that the prior-art heavy-duty truck or bus tire of FIG. 8, may be modified by molding sub-grooves or undertread probes 20 in the floor of the main tread groove, whereby the depth of 26/32 inch of the prior art main groove 10 be increased by the addition of undertread probe 20 having a depth of 6/32 inch, thereby providing a total effective tread depth of 32/32 inch, leaving a solid undertread 4/32 inch thick.

Since most governmental safety regulations provide that a tire may not be used in service with less than 2/32 inch of tread design remaining, it will be seen that, in the new tire of FIG. 7, the outer 30/32 inch of the original tread may be worn away before the tire must be removed, with 2/32 inch of tread remaining due to the undertread probes. Moreover, the fact that the tire has reached the full utilization of its original tread is signaled by the fact that the tire has been worn to the upper surface of the tie bar 21.

Tires incorporating the present invention have been thoroughly tested and found to meet all safety requirements, while at the same time giving approximately 25 percent more useful tire life.

The undertread probes and ties proposed by the present invention utilize effectively all of the usable undertread material on a heavy-duty truck or bus tire. The ties give the necessary signal to indicate that the tire has been fully worn and should be removed.

While the tire illustrated in the drawing is shown as having a single circumferential main groove, located on the center line of the tire, the invention may, of course, be applied to tires of any tread design.

What is claimed is:

1. A tire comprising:
   a. an undertread portion;
   b. a grooved design tread above the undertread portion;
   c. air-slot probes at spaced-apart locations extending downwardly from the bottom of the design-tread grooves into said undertread portion and having air communication with the surface of said tire through said design-tread grooves;
   d. said undertread probes having widths less than the width of the design-tread grooves at the floor thereof.

2. A tire according to claim 1 characterized in that tie bars are provided in said undertread probes.

3. A tire according to claim 2 characterized in that the height of said tie bar above the bottom of said undertread probes is equal to the minimum depth of tread permitted, whereby said undertread probe tie bar functions as a signal indicator to inform the user that the tire has been fully utilized and should be removed.

4. In a tire having undertread and design tread portions, the improvement which comprises forming probe grooves in the undertread as inward extensions of the design tread but of lesser width, whereby the tire may be used to maximum extent without destroying the safety characteristics of the tire.

5. In a tire according to claim 4, further characterized in that tread wear indicators are provided in said undertread probe grooves, said indicators being in the form of tie bars connecting the walls of said probe grooves.

6. A tire according to claim 3 characterized in that:
   a. said design-tread grooves are provided with tie bars between the walls of said grooves at spaced-apart intervals;
   b. said undertread probes are formed between said design-tread tie bars and have lengths less than the distance between said design-tread tie bars.

* * * * *